United States Patent [19]

van den Nieuwelaar et al.

[11] Patent Number: 4,815,168
[45] Date of Patent: Mar. 28, 1989

[54] METHOD AND APPARATUS FOR DIVIDING UP THE BODY OF SLAUGHTERED POULTRY

[75] Inventors: Josephus A. van den Nieuwelaar, Gemert; Petrus C. H. Janssen, Wilbertoord, both of Netherlands

[73] Assignee: Stork PMT B.V., Netherlands

[21] Appl. No.: 117,747

[22] Filed: Nov. 4, 1987

[51] Int. Cl.[4] ............................................. A22C 21/00
[52] U.S. Cl. ............................................. 17/52; 17/11
[58] Field of Search ................................... 17/11, 52

[56] References Cited

U.S. PATENT DOCUMENTS

| | | |
|---|---|---|
| 2,807,046 | 9/1957 | Hebenheimer . |
| 3,639,945 | 2/1972 | Duncan et al. . |
| 4,306,335 | 12/1981 | Hawk et al. . |
| 4,373,232 | 2/1983 | Harding et al. . |
| 4,439,891 | 4/1984 | van Mil . |
| 4,557,015 | 12/1985 | Dodd . |
| 4,558,489 | 12/1985 | van Mil . |
| 4,639,975 | 2/1987 | van der Eerden . |

*Primary Examiner*—Willie G. Abercrombie
*Attorney, Agent, or Firm*—Ostrolenk, Faber, Gerb & Soffen

[57] ABSTRACT

Method and apparatus for dividing up the carcass of a slaughtered bird, the carcass being suspended by its feet from a transport means, being transported with the breast to the front in the transport direction and, during transport thereof, being cut through by means of a cutting operation, the carcass being brought, before and during the cutting operation, into an oblique position relative to the transport direction such that the feet are placed in front of the remainder of the carcass, while an edge section, forming a boundry with the breast, of the rear opening, present between the feet of the carcass, is lowered from between the feet, and the cutting operation is carried out in a transverse direction in a plane extending between the lowered edge section and the thighs, so that the carcass is divided up into a rear half comprising the feet, thigh portions corresponding to the feet and a back portion, and a front half comprising a breast portion and a main portion of the back portion of the carcass, the front half being supported from the area in which the cutting operation is carried out and transported along a specified path to a subsequent processing station for the front half.

18 Claims, 7 Drawing Sheets

METHOD AND APPARATUS FOR DIVIDING UP THE BODY OF SLAUGHTERED POULTRY

BACKGROUND OF THE INVENTION

The invention relates to a method for dividing up the carcass of a slaughtered bird, the carcass being suspended by its feet from a transport means, being transported with the breast oriented to the front, i.e., toward the transport direction and, during transport thereof, being cut through by means of a cutting operation, the carcass being brought, before and during the cutting operation, into an oblique position slanted backwards relative to the transport direction such that the feet are forward of the remainder of the carcass. An edge section, namely an edge surrounding a rear opening of the bird forming a boundary with the breast, between the feet of the carcass, is below and between the feet, and the cutting operation is carried out in a transverse direction in a plane extending between the lowered edge section and the thighs, so that the carcass is divided up into a rear half comprising the feet, thigh portions corresponding to the feet and a back portion, and a front half comprising a breast portion and a main portion of the back portion of the carcass.

A method of this type is known from European Pat. No. 0,109,708 in the name of the Applicant. In a version of the known method the carcass of the slaughtered bird is divided up into the rear half and the front half. The rear half suspended by the feet can then additionally be cut through the middle between the feet by an additional cutting operation in a vertical plane. After cutting the front half from the rear half it always falls down with random orientation and is received in a collection trough.

The known method accordingly also has the drawback that, for further processing of the front half, the latter has to be taken out of the collection trough and again has to be brought to a particular orientation in order to carry out any subsequent cutting operation thereon. This method comprises a number of complicated and time-consuming manipulations so that the further processing of the front half is relatively time-consuming and the supply of front halves is quicker than the further processing of the halves. As a result, the collection trough will have to be replaced by an empty trough after a certain period of time, the supply of new slaughtered birds to be cut through having to be stopped. The supply and dividing up of slaughtered birds into rear and front halves can therefore not take place in an optimally efficient manner.

Another drawback of receiving the cut-up front halves in a collection trough is that the halves present in the trough can easily become contaminated and can no longer be packaged hygienically after a relatively long time.

Moreover, the above complicated manipulations for removing the front halves from the trough and orientating them again are not suitable for being carried out by means of a relatively simple device.

SUMMARY OF THE INVENTION

The invention aims to eliminate the drawbacks of the known method. This aim is achieved, according to the invention, by means of a method for dividing up the carcass of a slaughtered bird, the carcass being suspended by its feet from a transport means, being transported with the breast to the front in the transport direction and, during transport thereof, being cut through by menas of a cutting operation, the carcass being brought, before and during the cutting operation, into an oblique position relative to the transport direction such that the feet are placed in front of the remainder of the carcass, while an edge section, forming a boundary with the breast, of the rear opening, present between the feet of the carcass, is lowered from between the feet, and the cutting operation is carried out in a transverse direction in a plane extending between the lowered edge section and the thighs, so that the carcass is divided up into a rear half comprising the feet, thigh portions corresponding to the feet and a back portion, and a front half comprising a breast portion and a main portion of the back portion of the carcass, wherein the front half is supported from the area in which the cutting operation is carried out and is transported along a specified path to a subsequent processing station for the front half. As a result of this, the step of receiving a cut-up front half in a collection trough and the subsequent step of reorienting the front half are dispensed with. As a result of the fact that all the front halves are supported in the same way and are guided along the same specified path, the further processing of the front halves can easily be carried out exactly and uniformly. The further processing of the front halves takes place at the same speed as that at which the slaughtered birds are supplied. As a result, the method can always be carried out at an expedient speed, while the front halves which have been cut off and further processed can quickly be packaged hygienically.

Although a cut-off front half can be guided to the subsequent processing station under the influence of gravity, it is preferable for the front half to be gripped before being displaced, so that uniform speed of displacement and orientation of the front halves to the processing station are ensured.

For applying the method according to the invention the invention also provides a device, such as an apparatus for dividing up the carcass of a slaughtered bird, comprising a transport system, connected to a frame, suitable for suspending the carcass by the feet and transporting it with the breast at the front, a cutting device and an arm which is fastened so as to hinge relative to the frame, which is able to hinge in the vertical plane extending through the backbone of the carcass between two positions of the end of the arm, the end of the arm being suitable for sticking into the bird via the rear opening present between the feet in one of the two positions of the arm so that during further transport in which the arm is rotated to the other position, the breast of the bird is rotated forward as seen in the transport direction and the carcass is cut through in the transverse direction by means of at least one cutting member of the cutting device above the underside of the rear opening in a manner such that the carcass is divided up into a rear half comprising the feet, thigh portions corresponding to the feet and a portion of the back, and a front half comprising a breast portion and a main portion of the back portion of the carcass, wherein the arm is attached so as to hinge in the extension of and at the end of an essentially rod-shaped support which is attached and suitable for passing through the front half via the rear opening and for supporting the backbone portion of the front half, for thereby guiding the front half to a subsequent processing station.

The device preferably comprises displacement means which grip the front half for displacing the latter to the following processing station.

DETAILED DESCRIPTION OF A PREFERRED EMBODIMENT

Figure 1:
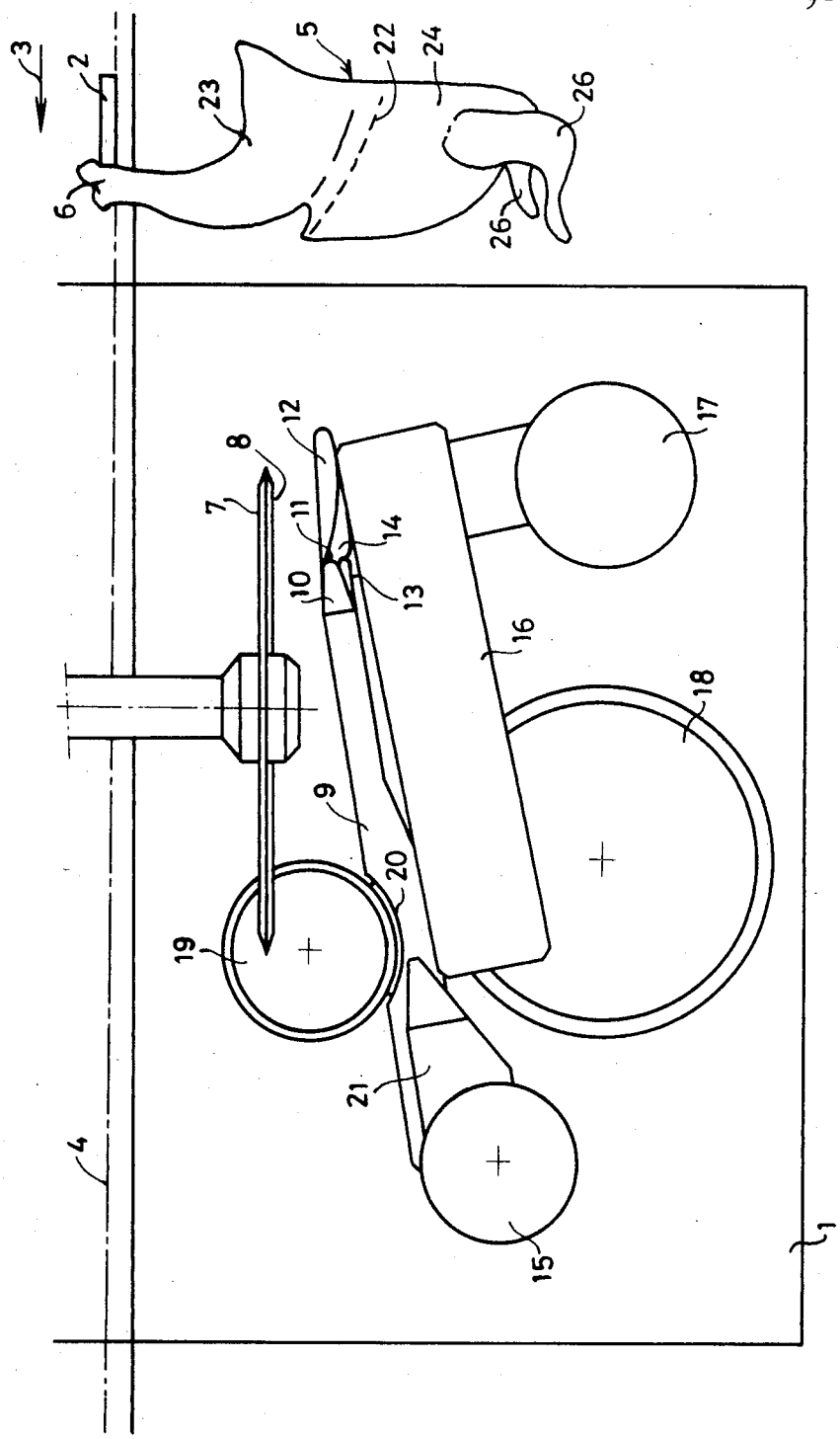
FIGS. 1 to 5 inclusive showing a device according to the invention. The figures show, respectively, five successive stages of the transport and the dividing-up of a slaughtered bird in a method according to the invention.

The figures in each case show a side view of the same section of a device having a frame 1 and a diagrammatically shown section of a transport system having a number of push elements 2 which are arranged at a distance from each other and are displaced in the direction of the arrow 3 along a horizontal path indicated by the dash/-dot line 4. The transport system is suitable for suspending thereon a slaughtered bird 5, the feet 6 being able to slide between and on two parallel sliding rods (not shown) so that the suspended bird 5 is displaced by a push element 2 in the direction of the arrow 3. Although in each of the figures only one push element 2 and one bird 5 (or portions thereof) are shown, the dimensions of the device shown in the drawing may be such that a number of birds 5 are displaced and cut through in the section shown.

The device comprises two knives 7, 8 which are arranged next to each other and horizontally, have a circular circumference, are driven by a drive device (not shown) and both the axes of rotation of which extend parallel to the plane of the drawing. The knives 7, 8 are arranged with their centers separated by a small horizontal distance so that the knives 7, 8 overlap each other. The area of overlapping of the knives 7, 8 is located between the feet 6 of a bird 5 transported between the knives 7, 8.

The device likewise comprises an elongated support 9 which is oriented in a vertical plane which passes through the overlapping section of the knives 7, 8. The support 9 is angled downwards, as seen in the drawings, in the transport direction 3 of the birds 5, and possesses an upper end 10 (to the right in the figures) to which an arm 12 fastened via a hinge 11. The arm 12 is rotatable in a vertical plane between a low position shown in FIGS. 1, 3, 4 and 5 and a high position shown in FIG. 2.

The arm 12 is rotated by means of a rod 13 an end of which is connected, at 14, eccentrically to the hinge 11, to the arm 12 by means of a rotating coupling. The rod 13 is slidable within the support 9 and is displaced to and fro in the longitudinal direction thereof by means of a drive device 15 coupled to the transport system. The to and fro displacement of the rod 13 takes place synchronously with the passage of the push elements 2 past the arm 12.

Two chain transporters 16 with projections directed towards the support 9 are arranged on either side of and at a distance from the support 9. Because chain transporters are known per se, only a cover plate of one chain transporter 16 is shown in the figures. The transporters 16 are coupled to a drive device 17 which is coupled with the transport system which includes the push elements 2, so that the speed of the transporters is matched with the speed of the push elements 2.

A knife 18 having a circular cross-section is attached in a vertical plane under a section of the support 9, and toward the lower end thereof.

Two knives 19 having a circular cross-section are attached above the support 9, even farther toward the lower end thereof, parallel to each other and on either side of the vertical symmetrical plane passing through the knives 7, 8 and 18. The distance between the two knives 19 is somewhat larger than the width of the backbone of the bird 5. With the exception of a section between the knives 19, the support 9 has two arched recesses 20 in which the knives 19 can rotate.

The knives 18, 19 are rotatably driven by means of a drive device, which is not shown.

Two branched-off elements 21 are attached at either side of the support 9 near an even lower section thereof than the knives 18, 19.

Figure 2:
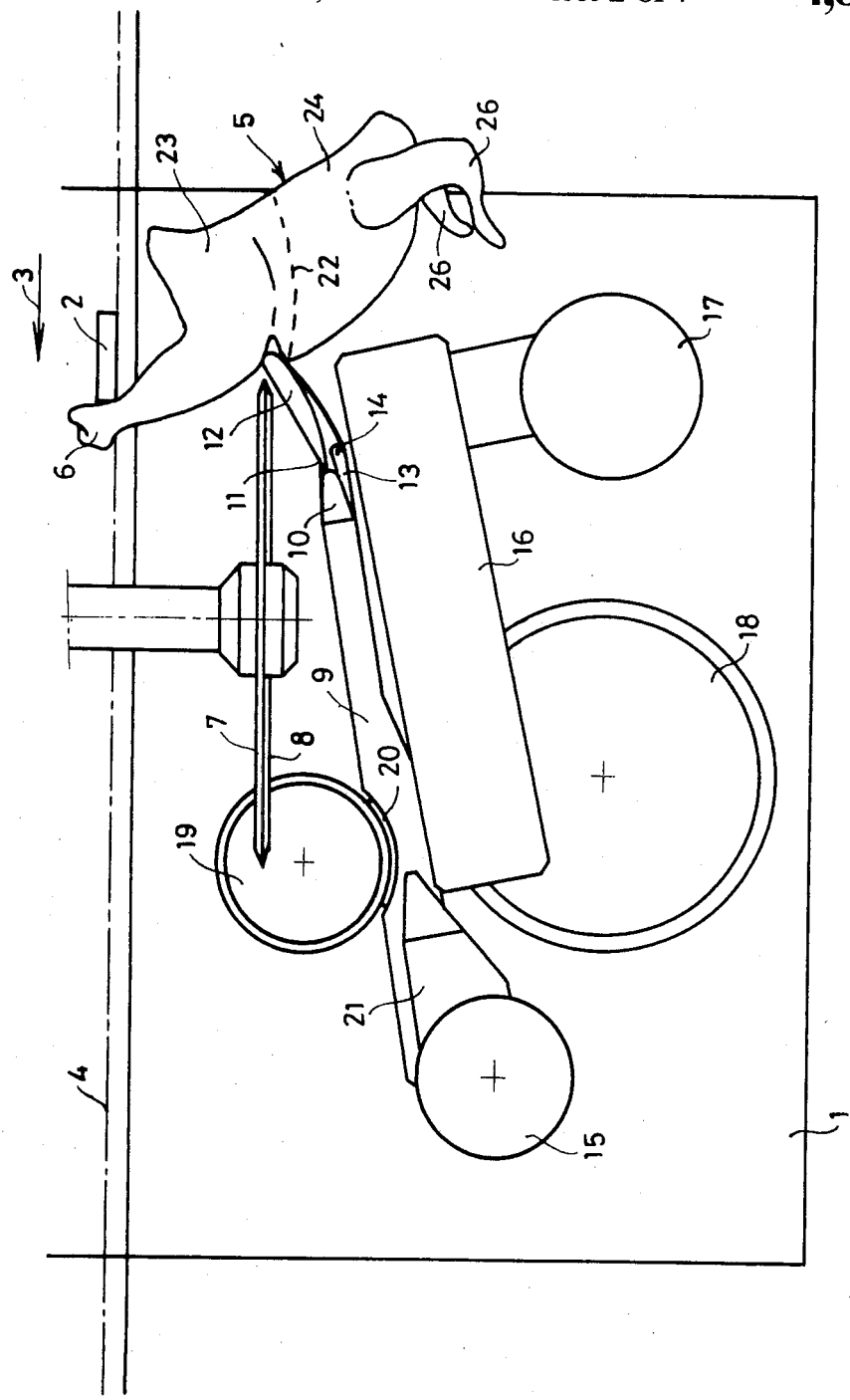
Figure 3:
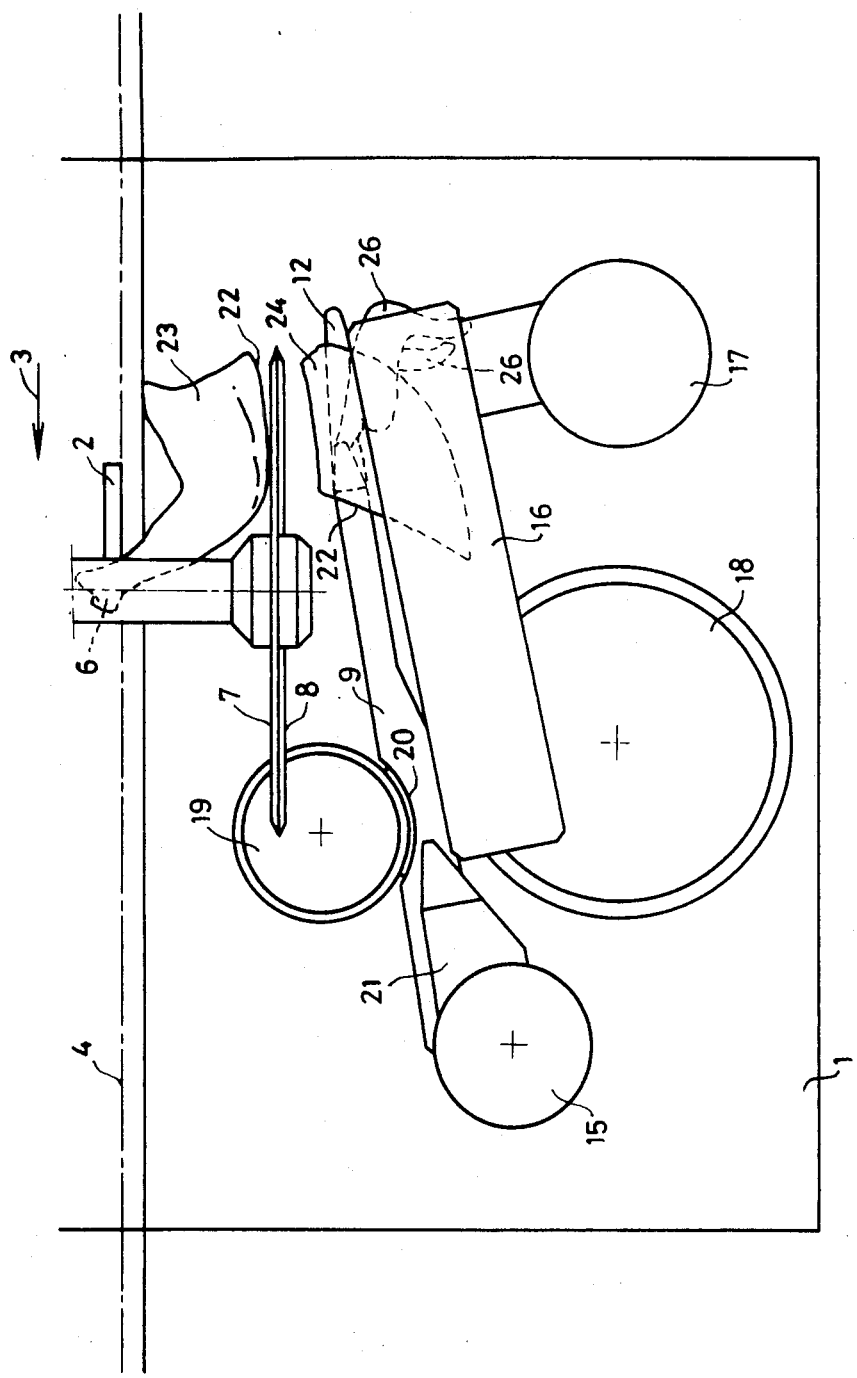

When the bird 5 approaches the position shown in FIG. 2 the arm 12, which is driven in the direction of the arrow 3 synchronously with the transport of the bird 5, will hinge upwards and, during the further transport of the bird 5 in the direction of the arrow 3, the uppermost end of the arm 12 will project above the lowermost edge portion of the rear opening of the bird 5, which is between the feet. During further transport of the bird 5 this edge boundary of the rear opening will bear against the underside of the arm 12 as a result of which the bird 5 is brought into an oblique position such as shown in FIG. 2.

During further transport of the bird 5 the latter will be cut through along a cutting line 22, by means of the knives 7, 8, to form a rear half 23 comprising the feet, the thigh portions corresponding to the feet, and a back portion, and a front half 24 comprising a breast portion and a main portion of the back portion where the ribs emerge.

The figures show that the supplied birds 5 have wings 26. The wings 26 can, however, be removed before reaching the device shown in the figures. The wings 26 can also be removed in the shown device by means of cutting members which are not shown.

During the cutting-through of the bird 5 into the halves 23, 24 by means of the knives 7, 8, the arm 12 will increasingly stick further into the front half 24. When the bird 5 has been completely cut through to form the halves 23, 24, the arm 12 is again turned back into the low position shown in FIG. 3 and the front half 24 rests against the upper side of the arm 12 by means of the backbone portion.

Figure 4:
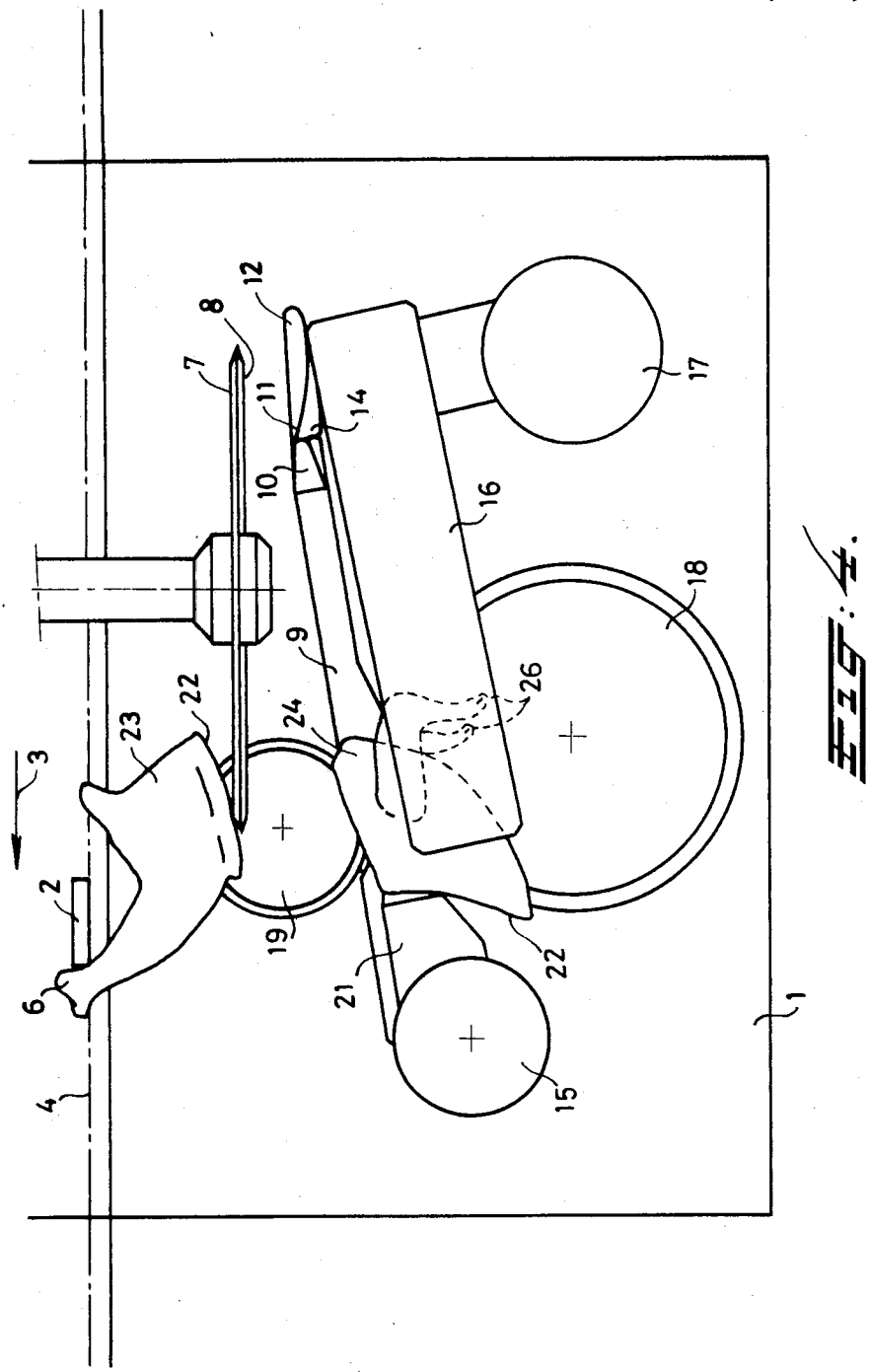
Figure 5:
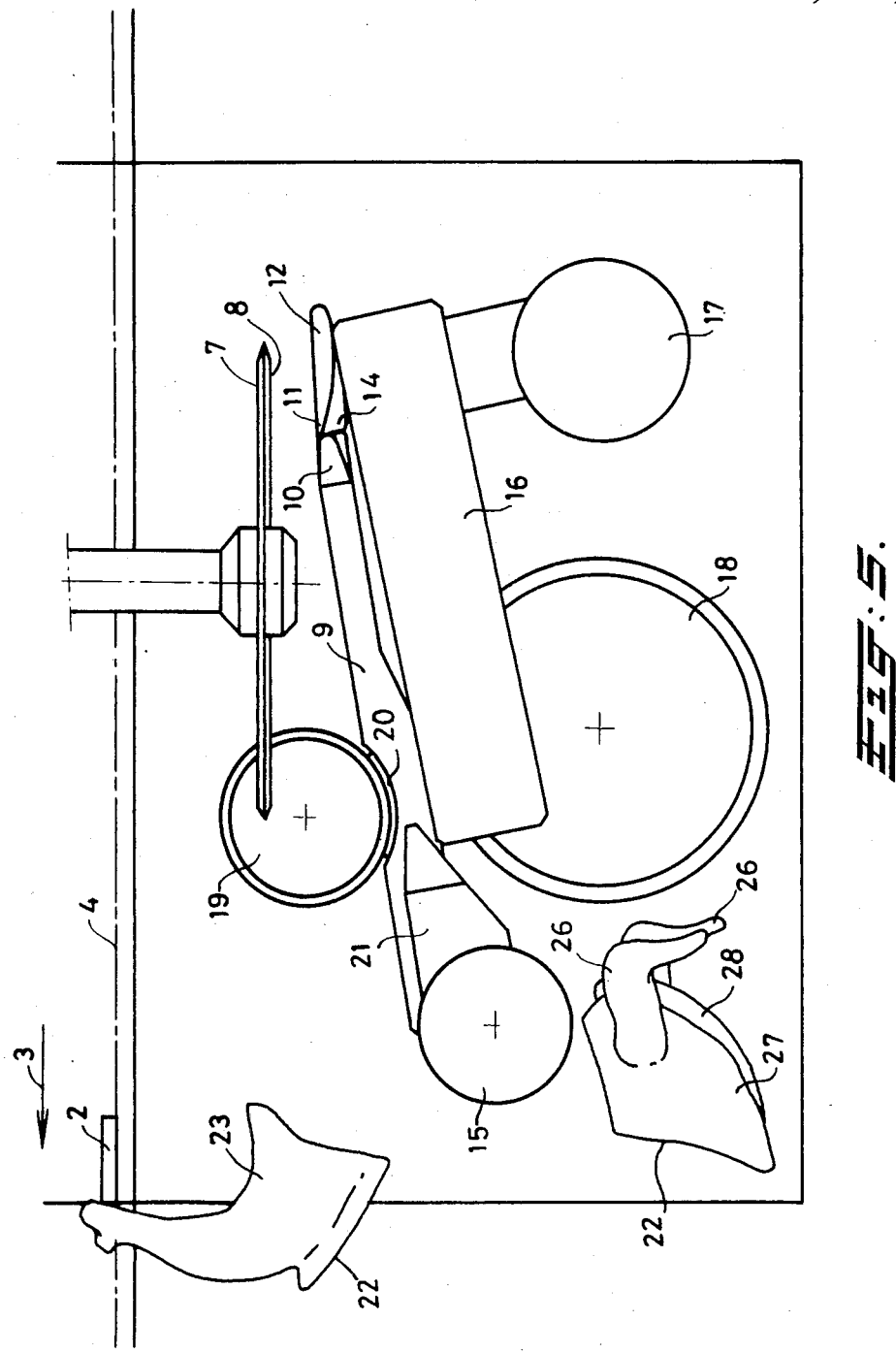
Figure 6:
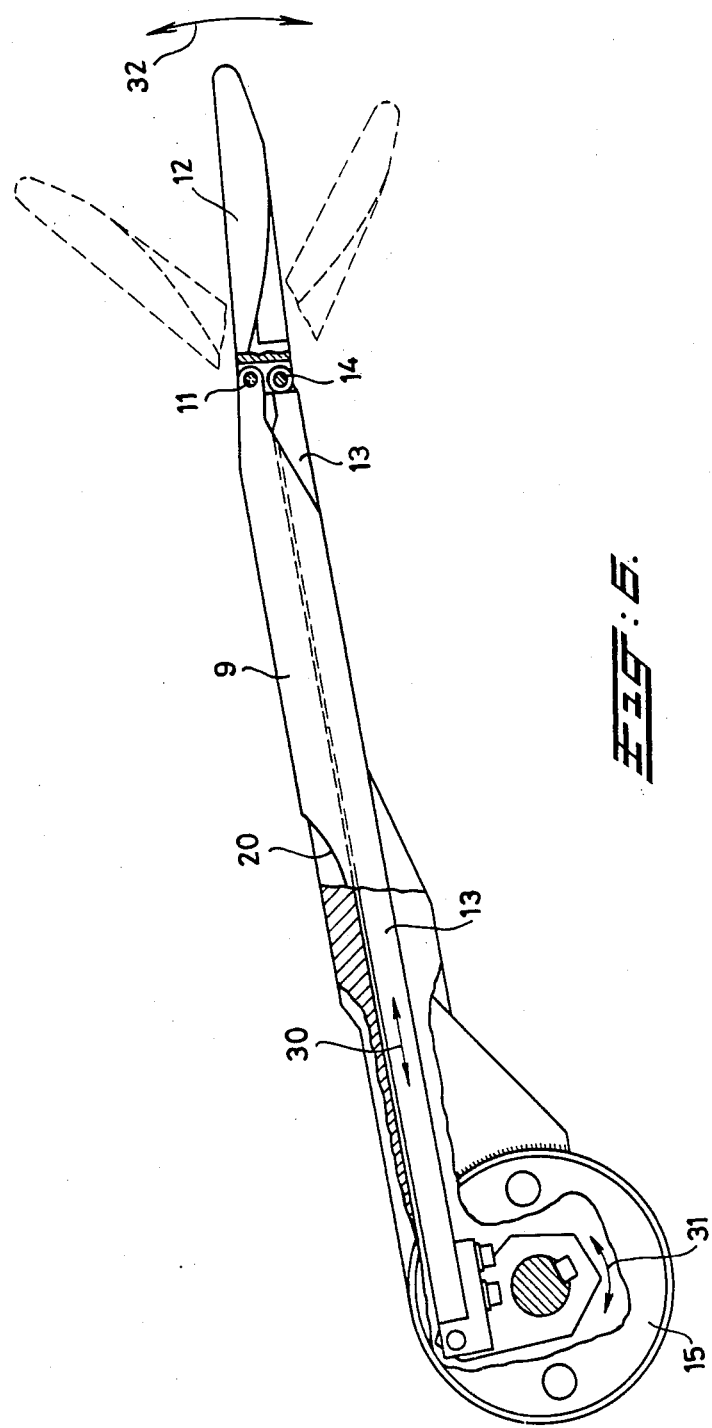
FIG. 6 is a side view, partially broken away of support 9 and associated elements.
Figure 7:
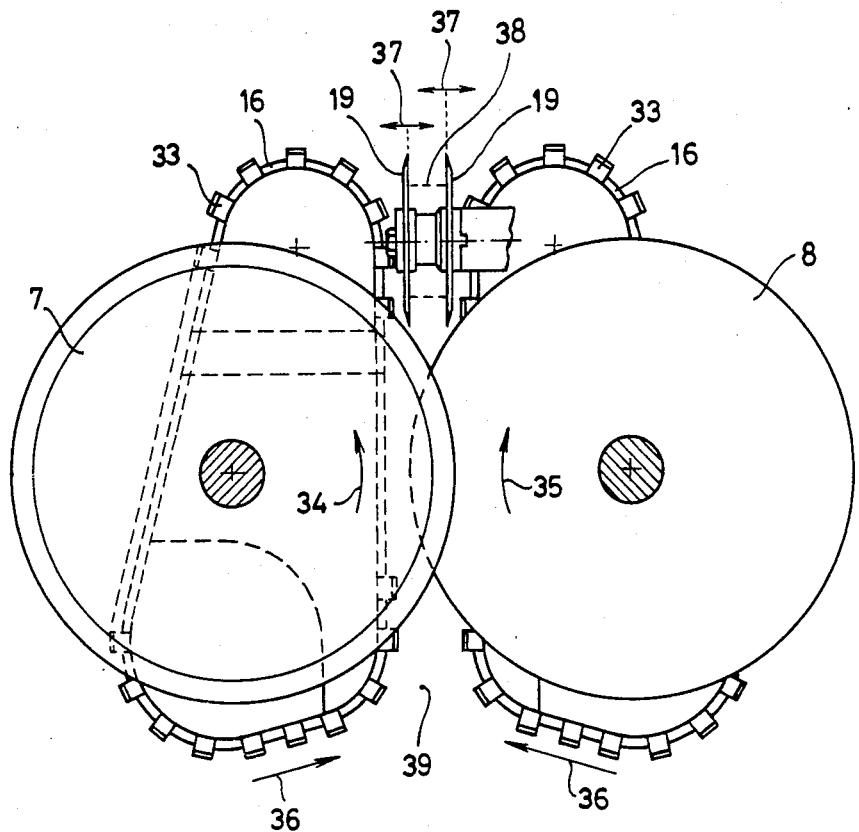
FIG. 7 is a plan view of a portion of the apparatus showing a pair of knives and the chain transporters.

Then the front half 24 slides over the arm 12 and over the support 9 to which the arm 12 connects, the front half 24 being gripped on its sides by the chain transporters 16 at either side of the support 9. As shown in FIG. 4, the front half 24 is thereby displaced into contact with the vertical knives 18, 19. The knife 18 will thereby cut through the breast portion opposite the backbone and the pair of knives 19 will cut through the back portion on either side of the backbone, so that the front half 24 is divided up into two symmetrical half breast pieces 27, 28 (FIG. 5). The breast pieces 27, 28 are moved away from the support 9 by means of branched-off elements 21 on either side of the support 9.

The breast pieces 27, 28 may be received in a collection trough (not shown) or can be gripped firmly by a packaging device (not shown) from roughly the position shown in FIG. 4, and thereafter transported and packed.

Tests have shown that the front halves 24 can be guided to the subsequent processing station, in this case having knives 18 and 19, even without the presence of a transporter, such as 16. The transport of the front halves 24 then takes place essentially as a consequence of gravity.

The transporter 16 may be moved away by flaps, hinges or the like so that the sliding of the front halves can take place selectively either by means of the transporter or essentially by gravity.

A roll having an outer surface which is not completely smooth may be arranged between the pair of knives 19, so as to be driven together with the knives 19, the roll having a diameter such that it can bear against the backbone of each front half 24 before transport of this front half 24. As a result, transport of the front half 24 takes place in the area of the knives 19 and the cut-out backbone is removed from between the knives 19.

In a suitable arrangement and embodiment of the various knives these contribute to the transport of the front halves 24.

What is claimed is:

1. Method for dividing up the carcass of a slaughtered bird, said carcass having an edge section defined therein which surrounds a rear opening in said carcass, adjacent the breast of said carcass, said method comprising the steps of:

suspending the carcass by its feet from a transport means, operating the transport means to transport said carcass with the breast to the front in the transport direction and, during transport thereof, cutting said carcass through by means of a cutting operation, and further comprising the steps of:

bringing the carcass, before and during the cutting operation, into an oblique position angled rearwards relative to the transport direction such that the feet are relatively forward of the remainder of the carcass, and such that said edge section is below and between the feet, and angled rearwardly therefrom, and carrying out a cutting operation in a transverse direction in a plan extending between the edge section and the thighs, so that the carcass is divided up into a rear half comprising the feet, thigh portions corresponding to the feet, and a back portion, and a front half comprising a breast portion and a main portion of the back portion of the carcass, said method further comprising:

supporting the front half continuously from the area in which the cutting operation is carried out, and transporting the front half along a specified path to a subsequent processing station for the front half.

2. Method according to claim 1, wherein the support of the front half to said subsequent processing station takes place by supporting the inner side, which faces downwards, of the backbone portion of the front half.

3. Method according to claim 1, wherein the front half is guided obliquely downwards along said specified path.

4. Method according to claim 3, wherein the transport along said specified path takes place under the action of gravity on the front half.

5. Method according to claim 1, wherein the transport of said carcass takes place under the action of mechanically exerted forces.

6. Method according to claim 1, wherein a cutting operation is carried out in the subsequent processing station for the front half for cutting through the backbone portion along at least one side of the backbone.

7. Method according to claim 1, wherein a cutting operation is carried out in the subsequent processing station for the front half for cutting through the breast portion in the longitudinal direction opposite the backbone.

8. An apparatus for dividing up the carcass of a slaughtered bird, said carcass having an edge section defined therein which surrounds a rear opening of said carcass, said apparatus comprising:

a frame;

a transport system secured to said frame, which defines a forward transport direction and a rearward direction, said transport system being operable for suspending a carcass by the feet and transporting it with the breast forward;

arm means which is mounted on the frame and extends in the rearward direction, and which is operable for engaging said edge section during the forward transport of said carcass, for tilting the carcass obliquely rearward;

cutting means mounted on said frame and extending in said transport direction, for engaging said edge section of said carcass which is tilted obliquely rearward, to cut said carcass during said transport operation into a rear half comprising the feet, thigh portions corresponding to the feet, and a portion of the back, and a front half comprising a breast portion and a main portion of the back portion of the carcass, an elongated support secured to said frame for passing through the front half via the rear opening after the cutting thereof, and for supporting the backbone portion of the front half, for thereby guiding the front half to a subsequent processing station;

wherein said arm means comprises an arm connected by a hinge to a rearward portion of said elongated support, said arm being rotatable in a vertical plane which extends through the backbone of said carcass; said arm having an upper position in which it engages said edge section of said carcass; and a lower position in which it substantially lines up with said elongated supported means and thereby permits said front half to be guided by said elongated support to said subsequent processing station.

9. Apparatus according to claim 8, wherein the support, as seen in the transport direction, is attached to the frame so as to extend obliquely downwards from the arm.

10. Apparatus according to claim 8, comprising displacement means which grip the front half for displacing the latter to the subsequent processing station.

11. Apparatus according to claim 10, wherein the displacement means are formed by an elongated transporter which is attached along at least one side of the support and grips the corresponding side of the front half.

12. Apparatus according to claim 11, wherein the transporter comprises an endless transport element having projections gripping the side of the front half.

13. Apparatus according to claim 8, comprising drive means connected to the arm for rotating the arm to and fro between the two positions, synchronously with the displacement of the carcass through the transport system.

14. Apparatus according to claim 13, wherein said drive means for said arm comprises:
coupling means coupled to said transport system for synchronizing said arm with said transport system; and a rod mounted extending along the support; said rod being movable to and fro by said coupling means along the support; said rod engaging said arm eccentrically relative to said hinge, whereby said arm rotates between said upper and lower positions as said rod moves to and fro.

15. Apparatus according to claim 14, wherein the rod is disposed within the support.

16. Apparatus according to claim 18, wherein the subsequent processing station comprises another cutting device for cutting through the backbone portion of the carcass along at least one side of the backbone.

17. Apparatus according to claim 18, wherein the subsequent processing station comprises another cutting device for cutting through the breast portion in the longitudinal direction opposite the backbone.

18. Apparatus according to claim 10, wherein the displacement means further comprise a toothing of a cutting element of at least one said cutting device.

* * * * *